:United States Patent Office 3,459,760
Patented Aug. 5, 1969

3,459,760
HALOMERCURI DERIVATIVES OF 2,5-OXADI-
AZOLIDINEDIONES OF BASIC AMINO ACIDS
AND THEIR USE IN PEPTIDE SYNTHESIS
John B. Conn, Westfield, N.J., assignor to Merck & Co.,
Inc., Rahway, N.J., a corporation of New Jersey
No Drawing. Filed Apr. 28, 1966, Ser. No. 545,857
Int. Cl. C07d 49/30; C07f 3/10; C07g 7/04
U.S. Cl. 260—299                                     6 Claims

ABSTRACT OF THE DISCLOSURE

The invention disclosed herein is generally concerned with methods of preparing peptides containing basic amino acids and with novel compounds used in such preparations. More particularly it is concerned with the preparation of novel halomercuri N-carboxy anhydrides of basic amino acids such as arginine, histidine, lysine and ornithine, and with the utilization of these compounds in the preparation of peptides. These new halomercuri N-carboxy anhydrides are conveniently prepared by first forming a halomercuri salt of the desired basic amino acid, and reacting the latter with phosgene.

---

The synthesis of peptides particularly heteropeptides of both high and low molecular weight is a problem which has long challenged the art. Such products are useful as stepping stones in the synthesis of proteins. Some of them are therapeutically active. They are also useful in the study and analysis of proteins, especially in studies designed to gain insight into the mode of action of enzymes, hormones, and other proteins with important functions in the body.

Many methods have been devised for the synthesis of peptides, but none are completely satisfactory. Most of these procedures are based on a stepwise synthesis in which, initially, the α-amino group of one amino acid is protected with an easily removed group such as a benzyloxycarbonyl group. The carboxyl group of this protected amino acid is then activated for reaction with the α-amino group of a second amino acid. A typical method of activation is to convert the protected amino acid to an acid chloride. The protected, activated amino acid is next reacted with a second amino acid to produce the peptide by the formation of an amide bond between the activated carboxyl group of the protected amino acid and the α-amino group of the second amino acid. In the final step, the protecting group is removed.

The synthesis of peptides containing basic amino acids such as lysine, histidine or arginine has proved to be an especially difficult problem because of the presence of the additional functional group. Several methods have been devised in efforts to avoid the difficulty. In most of them the extra functional group is prevented from entering into the peptide forming reaction by protecting it with an easily removable group. The imido moiety of histidine, for example, may be blocked with a benzyl group which is later removed by hydrogenation or other reductive procedure. While this expedient may be acceptable for simple peptides containing only a few amino acid segments, it often causes problems with more complex polypeptides where the conditions required for removal of the benzyl or other protecting group are often so rigorous that other functional groups are adversely affected. In any event, whether low molecular weight peptides or polypeptides are being prepared, two extra steps, i.e. the formation of the protected amino acid and the removal of the protecting group are required in the overall synthesis.

One procedure for the preparation of peptides which has been employed chiefly in non-aqueous media, and only for the preparation of low molecular weight peptides such as dipeptides and tripeptides in the N-carboxy anhydride procedure (referred to herein as the NCA procedure). In this procedure one amino acid is converted to its N-carboxy anhydride, usually by reaction with phosgene and the anhydride is reacted with a second amino acid to form an intermediate carbamate. Often the carbamate will spontaneously decompose to the desired peptide and carbon dioxide. Alternatively the carbamate may be decarboxylated by the addition of acid. The NCA procedure is especially interesting since the formation of the anhydride accomplishes the dual purpose of protecting the α-amino group and activating the carboxyl group. Moreover the protecting group is easily removed by decarboxylation.

The adaptation of the NCA procedure to basic amino acids has proved troublesome principally because the extra functional group interferes with anhydride formation. Moreover, it is still usually best to protect the additional basic group to prevent loss of yield in peptide formation due to reaction between this group and a molecule of anhydride. For example, if it is sought to prepare lysyl-phenylanine by reaction between N-carboxy-lysine anhydride and phenylalanine, the yield may be considerably reduced by reaction between the one molecule of anhydride and the ε-amino group of another molecule of anhydride unless the ε-amino group is protected. The usual protecting groups, however, such as the benzyloxycarbonyl group or its analogs and homologs are unsatisfactory because of the difficulty in placing and removing the protecting group, and because of the low yields which are often encountered with such reactions. There is a need therefore for a process by which the NCA procedure can be easily and conveniently adapted to the preparation of peptides containing basic amino acids.

A process has now been discovered whereby N-carboxy anhydrides of basic amino acids can be conveniently prepared and utilized in the NCA synthesis. In accordance with this process a halomercuri salt of a basic amino acid is first reacted with phosgene to prepare a halomercuri-N-carboxy anhydride such as halomercuri-N-carboxy arginine anhydride. These novel compounds, in which the extra functional group is protected with an XHg group in which X is halogen are then reacted with an amino acid under controlled aqueous alkaline conditions to produce intermediate carbamates which are decarboxylated by the addition of acid to produce peptides. The mercury ions in the solution are removed by precipitation with hydrogen sulfide.

This invention will be more readily understood by reference to the following reaction sequence which illustrates the invention as applied to the preparation of lysyl-histidine.

(1)

$$H_2N(CH_2)_4-CH-COOH + 2HgCl_2 \xrightarrow{base}$$
$$\quad\quad\quad\quad\quad\quad |$$
$$\quad\quad\quad\quad\quad\quad NH_2$$

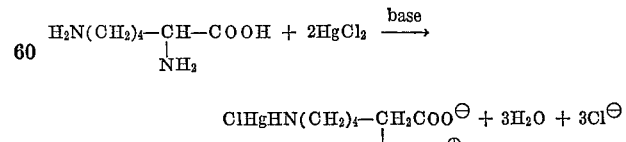

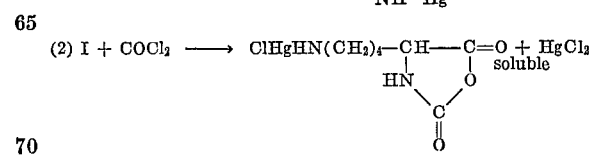

II

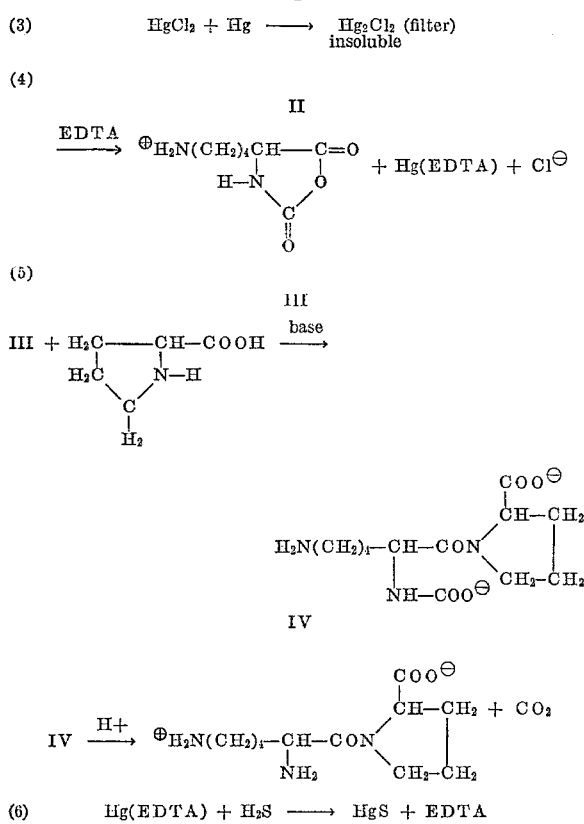

In the above series of equations ethylenediamine tetraacetic acid buffer (EDTA) is used as an illustrative of the class of buffers which may be employed to control the hydrogen ion concentration of the reaction mixture during the coupling reaction.

The halomercuri salt is first prepared by reaction between the amino acid and two molar equivalents of a mercuric halide salt in aqueous alkali. Although other mercuric halides may be employed it is preferred to utilize mercuric chloride because of its increased solubility compared with other mercuric halides. Reaction is normally effected by mixing the reactants in aqueous alkali at a pH of from about 8 to 9 at from about room temperature i.e. 20° C. to 35° C. to about 75° C. and allowing the reaction to continue, preferably with stirring, until substantial quantities of product are formed. The duration of the reaction period will vary with temperature, quantities of reactants and other factors, but in most cases a reaction period of from about one to three hours is satisfactory. The pH may be maintained in the desired range with alkali metal bases, especially alkali metal carbonates such as sodium or lithium carbonate. At hydrogen ion concentrations appreciably below 8 the yield of the desired salt containing two mercury ions is considerably decreased. At hydrogen ion concentrations above pH 9, the hydroxyl interferes with the course of the reaction.

For convenience the salts thus prepared will be referred to herein as halomercuri salts.

The halomercuri salts are converted to halomercuri-N-carboxy anhydrides by reaction with phosgene in a polar organic solvent, suitably a ketone containing, for example up to eight carbon atoms. Acetone is preferred because of its ready availability. Reaction is preferably effected at low temperature, i.e. from about 0° C. to about 10° C. by passing phosgene, preferably with stirring, through a mixture of the anhydride in the selected solvent. Temperatures somewhat above or below this range may be employed if desired. The novel compounds thus produced may exist as polymeric compounds, but they react as monomers and may be represented by formulas such as II, above.

At the end of the reaction period, which is normally from about one to four hours, the mixture will contain mercuric halide and the desired novel halomercuri-N-carboxy-basic amino acid anhydride in solution. The mercuric chloride is reduced to the insoluble mercurous salt which may be removed along with any excess metallic mercury by filtration or other suitable procedure. The desired product may then be isolated by removal of the solvent, preferably by distillation at reduced pressure.

The anhydride, thus prepared, may be converted to a peptide including dipeptides and polypeptides by reaction with an amino acid or peptide at a low temperature suitably about 0° C. to 10° C., in an aqueous alkaline medium during a reaction period of from about thirty seconds to about five minutes with good mixing. The intermediate carbamate which forms is then decarboxylated preferably by the addition of acid to reduce the pH of the medium to about two to five.

The carbamate is formed under alkaline conditions, preferably at a pH of from about 8 to 10.5. The desired alkalinity can be maintained using any of several known solid or liquid basic reagents such as magnesium oxide or dilute alkali metal hydroxides. It is sometimes convenient to add additional basic reagent during the course of the reaction so as to maintain the desired alkalinity. Various buffers can be employed. The basic reagent, however, should be one which does not react with the mercuric ion present in the reaction mixture to precipitate a mercuric salt. For this reason borate and phosphate buffers are not suitable except when used in small quantities in combination with other buffers. One buffering system which has been found to be especially suitable for use in this invention is EDTA, i.e. ethylenediamine tetraacetic acid. This buffer may be prepared by taking up EDTA in water, usually to a concentration of one molar and then adding sufficient alkali metal hydroxide to adjust to the desired pH. This buffer can be used together with small quantities of borate buffer if desired.

After decarboxylation the reaction mixture contains principally the desired product, i.e. the basic amino acid containing peptide and the mercuric ion, which may be associated with the buffer in the form of a soluble salt. The mercuric ion is removed from the reaction mixture by precipitation as a sulfide. This is most conveniently accomplished by passing hydrogen sulfide through the solution. The precipitated mercuric sulfide is preferably removed by filtration.

If desired the peptide may be recovered from the solution chromatographically or by freeze drying or other suitable procedure. Alternatively, the mixture may be made alkaline by the addition of a buffer or other base and the peptide prepared in accordance with this invention converted to a higher peptide. Both alternatives are illustrated in the examples.

The process of this invention is applicable to all basic amino acids whether naturally occurring or otherwise. It is applicable to both L and D forms of the acids and to racemic mixtures. It does not affect the symmetry of the molecule.

The following non-limiting examples are given by way of illustration only.

EXAMPLE 1

N-chloromercuri histidine N-carboxy anhydride

A total of 15.52 g. of L-histidine is added to an aqueous solution of 25.0 g. of a 2:3 mixture of potassium bicarbonate and potassium carbonate in one liter of water. To this mixture there is added with rapid stirring 54.30 g. of mercuri chloride with slight heating. The temperature is allowed to increase to about 65° C. and stirring is continued while the reaction mixture cools to room temperature. The product, N-chloromercuri histidine precipitates and is collected by filtration.

A total of 29.44 g. of the product thus prepared is stirred for about one and one-half hours in 100 ml. of dry acetone to form a fine suspension. An additional 100 ml. of acetone is added and the reaction mixture cooled in ice while passing in excess phosgene during a period of about 40 minutes. The ice is removed and 2 ml. of mercury is added to the mixture. The precipitate which forms is removed by filtration and the filtrate distilled at low pressure to remove the solvent and leave the desired product as a residue. It is purified by taking the residue up in 100 ml. of methyl ethyl ketone from which it precipitates on cooling. The precipitate is recovered, washed with a small amount of additional cold methyl ethyl ketone followed by benzene. Additional product is obtained by careful addition of benzene to the methyl ethyl ketone mother liquor.

The compounds listed are similarly prepared. In each case the starting amino acid is converted to a halomercuri salt by reaction of 0.1 mole of the starting amino acid with 0.2 mole of mercuric chloride or mercuric bromide in an aqueous medium at pH 8–9 in accordance with the procedure described above. The halomercuri salt is isolated and converted to the anhydride in acetone or methyl ethyl ketone. The first two compounds are prepared at 0° C. and the last five compounds at 10° C.

N-chloromercuri arginine N-carboxy anhydride
N-chloromercuri lysine N-carboxy anhydride
N-chloromercuri ornithine N-carboxy anhydride
N-bromomercuri arginine N-carboxy anhydride
N-bromomercuri lysine N-carboxy anhydride
N-bromomercuri ornithine N-carboxy anhydride
N-bromomercuri histidine N-carboxy anhydride

EXAMPLE 2

Histidyl-alanine

A total of 90 mg. of alanine is dissolved in 25 ml. of 0.2 molar EDTA buffer at pH 10 and 1.292 g. of N-chloromercuri histidine N-carboxy anhydride is added rapidly at 0° C. with rapid stirring. At the end of 5 minutes, the pH of the mixture is reduced to 2.5 by the addition of concentrated sulfuric acid. Hydrogen sulfide is bubbled through the mixture to precipitate the mercury and the precipitate removed by filtration. The filtrate is purged of hydrogen sulfide and other gases with nitrogen and diluted to a volume of 50 ml. The pH is adjusted to about 8 by the addition of dilute sodium hydroxide. The solution is desalted by passing over a carbon column. The desired product is isolated chromatographically by passage over a silica gel column and elution with 1:9 ammonia-methanol.

EXAMPLE 3

Lysyl-alanyl-leucyl-glycyl-isoleucine

A total of 368 mg. of analyl-leucyl-glycyl-isoleucine is taken up in 100 ml. of water containing EDTA buffer at pH 8 and 1.68 g. of N-chloromercuri lysine N-carboxy anhydride is added at 3° C. with rapid stirring. At the end of thirty seconds, the pH of the mixture is reduced to 2 by the addition of concentrated sulfuric acid. Hydrogen sulfide is bubbled through the mixture to precipitate the mercury as the sulfide which is removed by filtration. Nitrogen is bubbled through the filtrate to purge it of residual hydrogen sulfide and carbon dioxide. The filtrate is then diluted to 150 ml. and the pH adjusted to 8.5 by the addition of dilute sodium hydroxide. The solution is desalted by passing over a carbon column and the desired product isolated chromatographically from a silica column.

EXAMPLE 4

Glycyl-arginyl-glycyl-phenylalanyl-leucine

To a mixture of 4.0 mM. of leucine in 20 ml. of water at 0° C. there is added 3.1 moles of N-carboxy phenylalanine anhydride while maintaining the pH at 10.5 by intermittent addition of barium hydroxide powder. The reaction is complete in one minute. The pH is adjusted to 3.5 by the addition of ten percent sulfuric acid. The barium sulfate which precipitates is removed by filtration and the filtrate containing phenylalanyl-leucine treated with 3.2 mM. of N-carboxy glycine anhydride at −3° C. and a pH of 10.5 maintained using barium hydroxide. Decarboxylation is effected by adjusting the pH to 3.5 with concentrated sulfuric acid and the barium sulfate which precipitates removed by filtration. The pH of the filtrate is adjusted to 9.5 with EDTA buffer and 1.15 g. of N-bromomercuri arginine N-carboxy anhydride added at 5° C. with rapid stirring. At the end of 2 minutes the pH is adjusted to 2 by the addition of concentrated sulfuric acid. Hydrogen sulfide is bubbled through the mixture to precipitate mercury as the sulfide which is removed by filtration. The filtrate is purged with nitrogen and the pH adjusted to 10 with 40% potassium hydroxide. The mixture is cooled to 0° C. and 3.5 mM. of N-carboxy glycine anhydride added with rapid stirring. After one minute the pH is reduced to 3 by the addition of sulfuric acid and nitrogen is bubbled through the mixture for five minutes. The pH is adjusted to 7 and freeze dried. The solid residue is extracted three times with methanol and the methanol extracts adsorbed on silica gel and taken to dryness. The silica gel is then added to a silica gel column prepared in isopropanol. The column is developed with methanol:water:ammonia, 80:18:2, to isolate the desired product.

What is claimed is:

1. Halomercuri N-carboxy anhydrides of basic amino acids selected from the group consisting of arginine, lysine, ornithine and histidine, and characterized in that the halomercuri radical is selected from the group consisting of chloromercuri and bromomercuri and is attached to the nitrogen of the basic amino substituent.

2. A produce of claim 1 in which the halide is a chloride.

3. The produce of claim 1 in which the halide is a chloride and the basic amino acid is arginine.

4. The product of claim 1 in which the halide is a chloride and the basic amino acid is lysine.

5. The product of claim 1 in which the halide is a chloride and the basic amino acid is histidine.

6. The product of claim 1 in which the halide is a chloride and the basic amino acid is ornithine.

References Cited

UNITED STATES PATENTS 2,716,647   8/1955   Richardson _____ 260—307
2,993,053   7/1961   Ballard _____ 260—307

OTHER REFERENCES

Bartlett et al.: J. Am. Chem. Soc., 79, 2153–2158 (1957).

Bartlett et al.: J. Am. Chem. Soc., 79, 2159–2160 (1957).

Fruton: Advances in Protein Chemistry, vol. 5, Anson et al. ed., Academic Press, New York, 1944, pp. 58–59.

LEWIS GOTTS, Primary Examiner

MELVYN M. KASSENOFF, Assistant Examiner

U.S. Cl. X.R.

260—112, 307, 431